(12) United States Patent
Nochilur

(10) Patent No.: US 11,036,622 B2
(45) Date of Patent: Jun. 15, 2021

(54) AUTOMATED SOFTWARE TESTING

(71) Applicant: Accenture Global Solutions Limited, Dublin (IE)

(72) Inventor: Sunder Ranganathan Nochilur, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 1 day.

(21) Appl. No.: 16/429,328

(22) Filed: Jun. 3, 2019

(65) Prior Publication Data
US 2020/0379887 A1 Dec. 3, 2020

(51) Int. Cl.
*G06F 11/36* (2006.01)
*G06F 17/18* (2006.01)

(52) U.S. Cl.
CPC ...... *G06F 11/3684* (2013.01); *G06F 11/3664* (2013.01); *G06F 11/3688* (2013.01); *G06F 17/18* (2013.01)

(58) Field of Classification Search
CPC ............. G06F 11/3648; G06F 11/3664; G06F 11/3688; G06F 17/18
See application file for complete search history.

(56) References Cited

U.S. PATENT DOCUMENTS

| | | | |
|---|---|---|---|
| 8,869,110 B2 | 10/2014 | Kaksonen | |
| 9,632,917 B2 | 4/2017 | Cai et al. | |
| 9,779,013 B2 | 10/2017 | Narayan et al. | |
| 9,983,984 B2 | 5/2018 | Rahulkrishna et al. | |
| 10,169,215 B2 | 1/2019 | Anantharam et al. | |
| 10,949,338 B1* | 3/2021 | Sirianni | G06F 11/3664 |
| 2008/0320462 A1 | 12/2008 | Bergman et al. | |
| 2010/0180256 A1* | 7/2010 | Gorthi | G06F 11/3684 |
| | | | 717/124 |

(Continued)

OTHER PUBLICATIONS

Rahulkrishna et al., Automated Modularization of GUI Test Cases, IEEE, 2015, retrieved online on Mar. 24, 2021, pp. 44-54. Retrieved from the Internet: URL: https://ieeexplore.ieee.org/stamp/stamp.jsp?tp=&arnumber=7194560>. (Year: 2015).*

(Continued)

*Primary Examiner* — Hanh Thi-Minh Bui
(74) *Attorney, Agent, or Firm* — Fish & Richardson P.C.

(57) ABSTRACT

Methods, systems, and apparatus, including computer programs encoded on a computer storage medium, for automated software testing are disclosed. In one aspect, a method includes the actions of accessing plurality of test cases that each includes a plurality of test steps. The actions further include identifying a first group of modules that each include at least two sequential test steps. The actions further include comparing each module in the first group. The actions further include identifying a second group that each include the same first sequential test steps. The actions further include identifying a third group that each include the same first sequential test steps and the same second sequential test steps. The actions further include generating a fourth group. The actions further include selecting a subset of the fourth group. The actions further include updating the plurality of test cases by modularizing the test steps of the fourth group.

17 Claims, 5 Drawing Sheets

(56) References Cited

U.S. PATENT DOCUMENTS

2010/0287534 A1* 11/2010 Vangala .............. G06F 11/3612
717/124
2015/0160942 A1 6/2015 Bhuiya et al.
2015/0234733 A1* 8/2015 Cai .................... G06F 11/3684
714/38.1
2019/0155572 A1 5/2019 Misra et al.

OTHER PUBLICATIONS

Harrold et al., "A Methodology for Controlling the Size of a Test Suite" ACM Transactions on Software Engineering and Methodology, Jul. 3, 1993, 2(3):270-285.
Extended European Search Report in European Appln. No. 20168275.4, dated Aug. 17, 2020, 7 pages.

* cited by examiner

```
                                    200
                                       ↘

┌─────────────────────────────────────────────────────────────────────────┐
│  Access a plurality of test cases that each includes a plurality of     │
│  test steps                                                         210 │
└─────────────────────────────────────────────────────────────────────────┘
                                    ↓
┌─────────────────────────────────────────────────────────────────────────┐
│  Identify a first group of modules that each include at least two       │
│  sequential test steps and that are included in at least two test cases │
│                                                                     220 │
└─────────────────────────────────────────────────────────────────────────┘
                                    ↓
┌─────────────────────────────────────────────────────────────────────────┐
│  Compare each module in the first group of the modules to each other    │
│  module in the first group of the modules                           230 │
└─────────────────────────────────────────────────────────────────────────┘
                                    ↓
┌─────────────────────────────────────────────────────────────────────────┐
│  Based on comparing each module in the first group of the modules to    │
│  each other module in the first group of the modules, identify a second │
│  group of the modules that are included in the first group of the       │
│  modules and that each include the same first sequential test steps as  │
│  at least another module in the second group of the modules         240 │
└─────────────────────────────────────────────────────────────────────────┘
                                    ↓
┌─────────────────────────────────────────────────────────────────────────┐
│  Identify a third group of the modules that are included in the second  │
│  group of the modules, that each include the same second sequential     │
│  test steps, and that are included in a first group of the test cases   │
│                                                                     250 │
└─────────────────────────────────────────────────────────────────────────┘
                                    ↓
┌─────────────────────────────────────────────────────────────────────────┐
│  Identify a fourth group of the modules that are included in the second │
│  group of the modules, that each include the same second sequential     │
│  test steps and the same third sequential test steps, and that are      │
│  included in a first group of the test cases                        260 │
└─────────────────────────────────────────────────────────────────────────┘
                                    ↓
┌─────────────────────────────────────────────────────────────────────────┐
│  Generate a fifth group of the modules by removing the third group of   │
│  modules from the first group of modules                            270 │
└─────────────────────────────────────────────────────────────────────────┘
                                    ↓
┌─────────────────────────────────────────────────────────────────────────┐
│  Select a subset of the fifth group of the modules                  280 │
└─────────────────────────────────────────────────────────────────────────┘
                                    ↓
┌─────────────────────────────────────────────────────────────────────────┐
│  Update the plurality of test cases by modularizing the test steps that │
│  correspond to the subset of the fifth group of the modules         290 │
└─────────────────────────────────────────────────────────────────────────┘
```

| Test Step ID | No | Step Description |
|---|---|---|
| TC1 | 1 | Launch Browser and navigate to www.someestore.com |
| TC1 | 2 | Enter username and password and click on login |
| TC1 | 3 | Serach for Mobile phones with 3 rear cameras |
| TC1 | 4 | select 2 phones from search results |
| TC1 | 5 | Compare products |

308, 310

304

| Test Step ID | No | Step Description |
|---|---|---|
| TC2 | 1 | Launch Browser and navigate to www.someestore.com |
| TC2 | 2 | Enter username and password and click on login |
| TC2 | 3 | Serach for Mobile phones with 3 rear cameras |
| TC2 | 4 | select 2 phones from search results |
| TC2 | 5 | Compare products |
| TC2 | 6 | Select 1 product |
| TC2 | 7 | Add to cart |
| TC2 | 8 | Checkout |
| TC2 | 9 | Make payment |
| TC2 | 10 | Confirm Order number |

312, 314

306

| Test Step ID | No | Step Description |
|---|---|---|
| TC3 | 1 | Open Production management application |
| TC3 | 2 | Navigate to the Production Administration Screen |
| TC3 | 3 | Add a new Product (Type = Mobile, Company = AAA, Brand = BBB, Number of Primary Cameras = 3, Model Name = CCC) |
| TC3 | 4 | Launch Browser and navigate to www.someestore.com |
| TC3 | 5 | Enter username and password and click on login |
| TC3 | 6 | Serach for Mobile phones with 3 rear cameras |
| TC3 | 7 | Select CCC from the results and view details |

AUTOMATED SOFTWARE TESTING

TECHNICAL FIELD

This disclosure generally relates to software testing.

BACKGROUND

Software testing is an investigation conducted to provide information about the quality of the software product or service under test. Test techniques include the process of executing a program or application with the intent of finding software bugs, and verifying that the software product is fit for use.

SUMMARY

When generating automated test cases to test software, some of the test cases may include the same steps. For example, there may be several different test cases to test a different aspect of an online shopping website. Each of those test cases may include the steps of opening a browser and navigating to the shopping website. These repeating groups of steps may be referred to as a module.

To identify the modules, a system may generate all possible combinations of sequential test steps in each test case and compare those combinations to determine which ones are common across more than one test case. Some of the common modules may be subsets of larger common modules, and some of the modules that are not identical may still have the same functionality. In this case, the system may eliminate the smaller modules that are subsets of larger modules and merge the modules that have the same functionality. The system can then generate code for the module that can replace the corresponding code in each corresponding test case. It may then be easier for the system to update each of those test cases by updating the module once instead of updating each test case individually. The system can also use the modules to generate new test cases to test different aspects of the software.

According to an innovative aspect of the subject matter described in this application, a method for automated software testing includes the actions of accessing, by a computing device, plurality of test cases that each includes a plurality of test steps; identifying, by the computing device, a first group of modules that each include at least two sequential test steps and that are included in at least two test cases; comparing, by the computing device, each module in the first group of the modules to each other module in the first group of the modules; identifying, by the computing device, a second group of the modules that are included in the first group of the modules and that each include the same first sequential test steps; identifying, by the computing device, a third group of the modules that are included in the first group of the modules and that each include the same first sequential test steps and the same second sequential test steps; generating, by the computing device, a fourth group of the modules by removing the second group of modules from the first group of modules; selecting, by the computing device, a subset of the fourth group of the modules; and updating, by the computing device, the plurality of test cases by modularizing the test steps that correspond to the subset of the fourth group of the modules.

These and other implementations can each optionally include one or more of the following features. The actions further include, before identifying the first group of modules: providing, by the computing device, each test case as an input to a model that is configured to determine whether each test step is a significant step; receiving, by the computing device and from the model, data indicating whether each test step is a significant step; and removing, by the computing device and from each test case, each test step that is identified as not significant. The actions further include receiving, by the computing device, data identifying multiple test steps that are each labeled as either significant or not significant; and training, by the computing device and using machine learning, the model using the data identifying the multiple test steps that are each labeled as either significant or not significant. The action of comparing each module in the first group of modules to each other module in the first group of modules includes concatenating step descriptions of test steps in each module; and comparing the concatenated step descriptions. The action of comparing the concatenated step descriptions includes hashing each concatenated step description; and comparing the hashed concatenated step descriptions.

The actions further include, after generating the fourth group of modules: determining, for each module in the fourth group of modules, a plurality of n-grams from each test description of the module; comparing the n-grams of each module in the fourth group of modules to each other; based on comparing the n-grams, identifying modules that are substantially similar; and updating the fourth group of modules based on identifying the modules that are substantially similar. The action of comparing the n-grams of each module in the fourth group of modules to each other includes determining a number of n-grams that each pair of modules has in common; and comparing the number of n-grams that each pair of modules has in common to a threshold. The action of selecting a subset of the fourth group of the modules includes determining a probability of identifying an failure by each test case for each module in the fifth group of modules; determining a number of test steps in each module in the fourth group of modules; determining an occurrence frequency for each module in the test cases; and selecting the subset of the fourth group of the modules based on the probability, the number of test steps and the occurrence frequency.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. Software testing packages may be easier to maintain because updating a shared module will update all test cases that share that module.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flowchart of an example process for modularizing and updating software test cases.

FIG. 3 illustrates three example text cases that each includes a series of test steps.

In the drawings, like reference numbers represent corresponding parts throughout.

DETAILED DESCRIPTION

Figure 1:
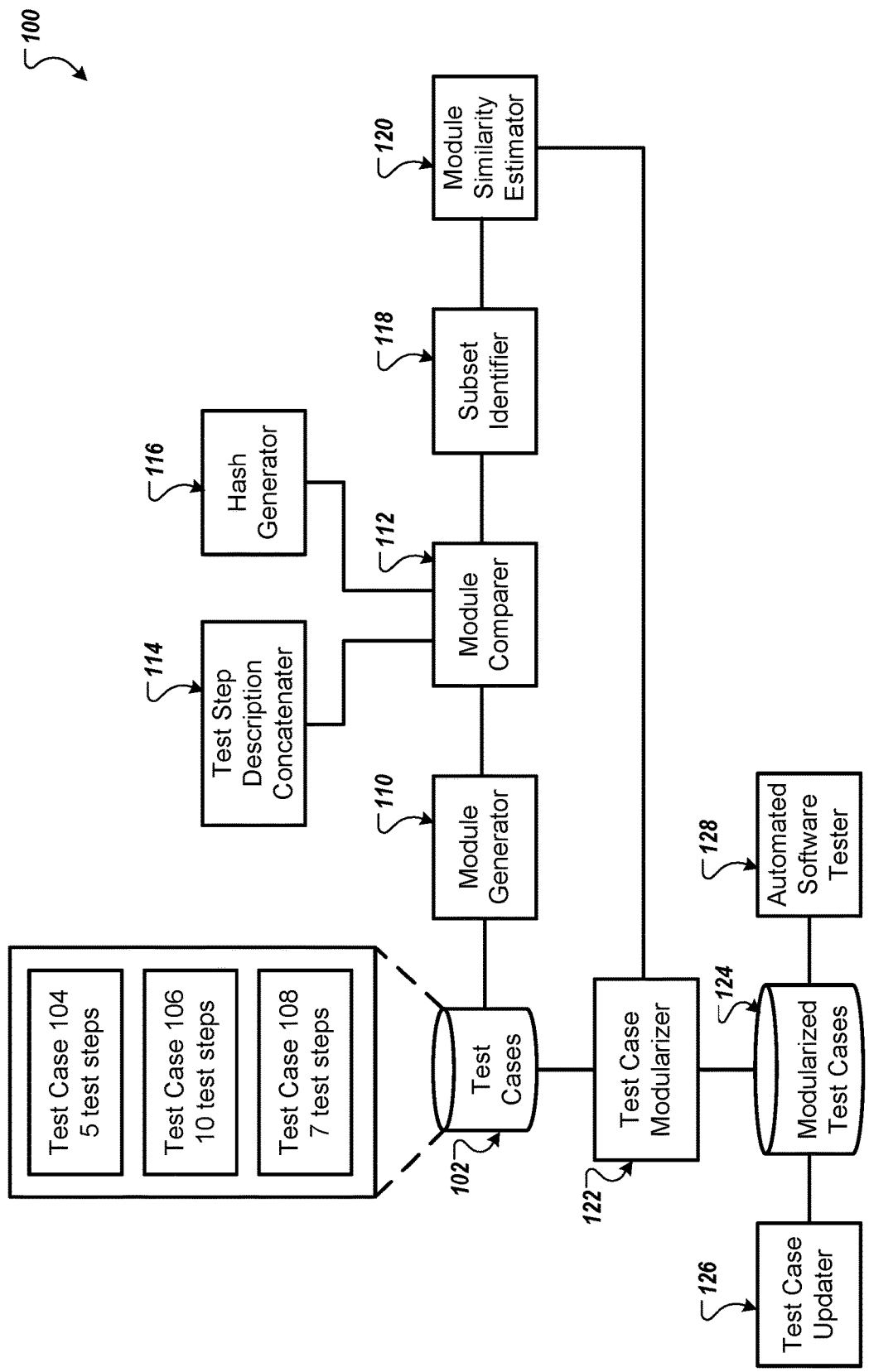
FIG. 1 illustrates an example system for modularizing and updating software test cases.

FIG. 1 illustrates an example system 100 for modularizing and updating software test cases. Briefly, and as described in more detail below, the system 100 analyzes several test cases 102. The system 100 identifies groups of test steps that are common across the test cases 102. The system 100 replaces some of those groups of common test steps with modules, which allows for the system 100 to maintain the test cases by maintaining modules instead of each test step.

In more detail, the test cases 100 may be configured to test various software applications. For example, test case 104 may include five test steps that are configured to test the comparison function on a shopping website. Test case 106 may include ten test steps that are configured to test the purchasing function of a shopping website. Test case 108 may include seven test steps that are configured to test the searching function of a shopping website. The test cases 100 may include other test cases that are configured to test different applications such as a word processing application, an email application, a photo editor, and any other types of applications.

Each test case includes several different test steps that may each be described with a step description. The step descriptions may be generated automatically based on the underlying source code or may be generated by a test engineer. In some implementations, the test step descriptions may be limited to a certain number of characters such as two hundred characters.

The system 100 includes a module generator 110. The module generator is configured to identify and generate the modules for each of the test cases 102. A module may include sequential test steps in each test case. The number of modules in each test case may be related to the number of test steps in the test case. A test case with two steps will have one module. A test case with three steps will have two modules. A test case with n steps will have n(n−1)/2 modules.

In some implementations, the module generator 110 may be configured to identify insignificant steps in each test case. This may occur before identifying the modules for each test case. The module generator 110 may provide each test step to a model that is configured to determine whether the test step if significant or not significant. The system 100 may be configured to train the model using training data and machine learning. The training data may include a group of test steps that are labeled as significant and a group of test steps that are labeled as insignificant. As an example, an insignificant step may include moving a cursor. A significant step may include clicking on an icon.

The module generator 110 may identify the insignificant steps and remove those insignificant steps from the test cases 102. The module generator 110 may then generate the modules for each of the test cases 102. In this instance, some of the test cases may have fewer step if the test case included some insignificant steps.

The system 100 includes a module comparer 112. The module comparer 112 may be configured to identify common modules between test cases. A common module may include two steps that appear in at least two test cases. For example, two test steps in test case 104 may be to launch a browser and navigate to www.buystuff.com. Test case 106 may also include those same two test steps of launching a browser and navigating to www.buystuff.com. For the module comparer 112 to identify these two common steps as a module, the test steps may be located at different locations in the test cases. For example, the tests steps may be located at steps two and three in test case 104 and steps four and five in test case 106.

The test step description concatenater 114 may concatenate the test descriptions of the test steps of each module. For example, if two test steps are "launch a browser" and "navigate to www.buystuff.com," then the concatenated test description may be "launch a browser navigate to www.buystuff.com." The module comparer 112 may compare the concatenated test descriptions to identify common modules.

In some implementations, the module comparer 112 may use the hash generator 116 to generate a hash of each concatenated test description. In this case, the hash generator 116 may apply a hashing algorithm to each of the concatenated test descriptions. The hash generator 116 may use an algorithm that generates a hash that is consistently the same length even if the length of the concatenated test description changes. The module comparer 112 may compare the hashes of the concatenated test descriptions to identify common modules.

In some instances, the module comparer 112 may identify common modules that are subsets of other common modules. This may occur because steps 1, 2, and 3 are common between two test cases. The module comparer 112 may identify steps 1, 2, and 3 as a common module, but also steps 1 and 2 and 2 and 3. The subset identifier 118 is configured to identify and remove those subset modules from the common modules. However, the subset identifier 118 may not remove the module for steps 1 and 2 if steps 1 and 2 appear in another test case without step 3.

To identify the subset modules, the subset identifier 118 may determine which modules some modules are included in. A module may be included in another module if it is in the same test case and includes a subset of the test steps of a larger module. With the subset identifier 118 identifying the modules that are subsets of larger common modules, the subset identifier 118 may remove those smaller modules from the group of common modules.

In some instances, the module comparer 112 may determine that two modules are different based on the hash values. Because the hash generator 116 generates a different hash value even if one character is different between concatenated test descriptions, the module comparer 112 may label them as different modules. For example, if one concatenated test description was "launch a browser navigate to www.buystuff.com" and another was "launch a browser navigate to buystuff.com," then the module comparer 112 would determine that those were different descriptions because the hash values would be different.

The module similarity estimator 120 may be configured to identify those modules that, in practice, are the same even if the text of the underlying descriptions is slightly different. To determine which modules are similar, the module similarity estimator 120 may identify the n-grams (e.g., monograms and bigrams) in each concatenated test description and compare those n-grams to other n-grams from other concatenated test descriptions. If the number of n-grams matches between concatenated test descriptions is above a threshold, then the module similarity estimator 120 may group those two modules and process them as if they were the same module.

The test case modularizer 122 may generate code modules for each of the modules identified by the module similarity estimator. In some implementations, the test case modularizer 122 may prioritize the identified modules and generate code modules for the highest priority modules. The test case modularizer 122 may determine the probability of each module based on a number of factors. The factors may include the number of steps in the module, the probability of the parent test cases generating an error in the software under test, and the number of times that the modules appears in the test cases 102. The test case modularizer 122 may determine the product, sum, arithmetic mean, or geometric mean of these factors. The test case modularizer 122 may generate code modules for the modules with the highest scores.

The test case module modularizer 122 may replace test steps that correspond to the generate code modules with the generated code modules. The test case module modularizer 122 may access the test cases 102, replace the test steps with the newly created modules and store them in the modularized test cases 124.

The system may include a test case updater 126 that may make changes to the test cases. With the test cases modularized, the test case updater 126 may only have to update a single module for the change to propagate across each test case that includes the module.

The system 100 may include an automated software tester 128 that may use the modularized test cases 124 to automatically perform software testing. The automated software tester 128 may also be configured to generate additional test cases using the modules and test software using the automatically generated test cases.

FIG. 2 is a flowchart of an example process 200 for modularizing and updating software test cases. In general the process 200 analyzes various test cases to identify common modules among the test cases. The process 200 selects a set of the common modules and generates modules that can be substituted into the test cases. The process 200 will be described as being performed by a computer system comprising one or more computers, for example, the system 100 as shown in FIG. 1.

The system accesses a plurality of test cases that each includes a plurality of test steps (210). Each test case may be source code that is configured to test a software application. Each step of the test case and in the source code may be described by a test description.

The system identifies a first group of modules that each include at least two sequential test steps and that are included in at least two test cases (220). In some implementations and before identifying any modules, the system identifies the test steps that are not significant and removes those insignificant steps. The system may identify an insignificant step by providing the step to model that is trained to determine whether a step is significant. The system may train the model using machine learning and training data that includes steps labeled as either significant or insignificant.

The system identifies common modules by concatenating test descriptions of sequential test steps. The system generates a hash of each concatenated test description and compares the hashes. If two hashes match, then the system determines that the underlying test steps are the same.

The system compares each module in the first group of the modules to each other module in the first group of the modules (230). In some implementations, the system, based on comparing each module in the first group of the modules to each other module in the first group of the modules, identifies a second group of the modules that are included in the first group of the modules and that each include the same first sequential test steps as at least another module in the second group of the modules (240).

The system, based on comparing each module in the first group of the modules to each other module in the first group of the modules, identifies a third group of the modules that are included in the second group of the modules, that each include the same second sequential test steps, and that are included in a first group of the test cases (250). The system, each module in the first group of the modules to each other module in the first group of the modules, identifies a fourth group of the modules that are included in the second group of the modules, that each include the same second sequential test steps and the same third sequential test steps, and that are included in a first group of the test cases (260). During these two actions, the system identifies the modules that may be subsets of other modules.

The system generates a fifth group of the modules by removing the third group of modules from the first group of modules (270). In this instance, the system may remove the modules that are sub-modules of larger common modules.

In some implementations, the system may identify the modules that perform substantially the same functions but have slightly different test descriptions. To do this, the system may identify the n-grams of each concatenated test description. The system can compare the n-grams of a concatenated test description to the n-grams of other concatenated test descriptions. If two concatenated test descriptions share at least a threshold number of n-grams, then the system may merge those concatenated test descriptions.

The system selects a subset of the fifth group of the modules (280). In some implementations, the system may prioritize the modules and select the highest ranking modules. The system may use several factors to prioritize the modules, and those factors may include the rate at which the parent test case identifies an error, the number of test steps in the module, and the number of times that the module appears in the test cases.

The system updates the plurality of test cases by modularizing the test steps that correspond to the subset of the fifth group of the modules (290). The system may modularize the highest ranking modules and replace the corresponding source code in the test cases with the modules. Each time an update is made to the module, the change will propagate to all test cases that share that module.

In more detail, testing a software application involves the process of creating several test cases that each include multiple test steps. As the software application ages, developers may add additional test cases, growing the suite of test cases. In some instances, different test cases may share common test steps that appear in multiple test cases in the same order. A group of test steps that repeats in multiple test cases may be referred to as a module.

Identifying modules in different test cases can be beneficial for several reasons. First, when automating additional test cases, it will require less computing and processing power to automatically generate the additional test cases if there are prepackaged modules that are available for inclusion in the new test cases. Second, maintaining test cases will require less computing and processing power because a module that several different test cases share may only need to be updated once and that change can be propagated across the test cases that include that module.

In some implementations, a system may identify test cases that are similar to each other and groups of test steps that are similar to each other based on comparing the text of the test cases and test steps. If the text is similar, then the system may determine that the test cases are similar. In some instances, the text may be the underlying code or the description of each test step in each test case. Even with this technique, it may still be difficult to determine groups of test steps that appear multiple times across multiple text cases.

FIG. 3 illustrates three example text cases that each includes a series of test steps. Test case 302, which may be identified as TC1, includes five test steps that each have a step description. Test case 304, which may be identified as TC2, includes ten test steps that each have a step description. Test case 306, which may be identified as TC3, includes seven test steps that each have a step description.

Based on a visual comparison of test case 302, test case 304, and test case 306, module 308, module 314, and module 316 are common in test case 302, test case 304, and test case. Module 310 and module 312 are common in test case 302 and test case 304. A module may be any groups of test steps that appear in more than one test case. A module need not appear in the same location in multiple test cases. For example, module 316 corresponds to test steps four through six of test case 306 and matches module 314 that corresponds to test steps one through three of test case 304.

In order to identify common modules across multiple test cases, a system may configured to identify the possible combinations of test steps in various test cases by concatenating the test step descriptions of individual test steps. The system may identify combinations of test steps that appear in more than one test case. The system may eliminate combinations of test steps that are subsets of other combinations. The system may optimize the modules by eliminating textually and semantically similar modules. The system may generate automation scripts for the modules.

Initially, the system identifies all possible combinations of test steps within a test case. The system may perform this identification for all test cases. In the example illustrated in FIG. 3, text case 302 may include ten different combinations. Using the numbers in the test step number column, the ten different combinations are 12345, 1234, 123, 12, 2345, 234, 23, 345, 45, and 45. For a test case with N steps, the test case includes N(N−1)/2 possible combinations of test steps.

Because the number of test step combinations increases significantly as the number of test steps increases, it may be beneficial for the system to eliminate test steps that may be insignificant. For example, a test step that is significant may be a test step to enter order details or to create a purchase order. A test step that is insignificant may be a test step for waiting, calling, or opening a browser. There may be two modules that are similar and the only difference between them may be that one module has a wait step and the other does not, while the other steps in the modules are the same.

To determine whether a test step is significant or insignificant, a system may train a model using machine learning to receive a test step and output whether the test step is significant or not significant. The system may train the model using labeled test steps that are labeled as either significant or insignificant. The system may use machine learning and the training data. In some instances, the system may update the model as more labeled training data becomes available.

The system may use the model to determine which steps are significant and which steps are insignificant. The system may remove the insignificant steps and generate test step combinations for each test case with the insignificant steps removed. In some implementations, removing an insignificant test step will reduce the number of test step combinations by about two percent.

A first step in determining the common modules is to generate a list that includes the test case identifier, the initial step number of the module, the ending step number of the module, and the cumulative description of each test step in the module. The system may generate multiple valid combinations of test steps for each test case by following a series of steps. The first step is determine the number of test steps in each test case. For each test case, determine the step number and step description for each test step. The system loads the step number and step descriptions for each test step into a temporary table. The system creates a loop and performs the loop one less number of times than the number of steps in the test case. The system loops through to determine the beginning step value, loops through to determine the ending step value, and concatenates the step descriptions of individual steps. The system inserts the test case identifier, beginning step number, ending step number, and cumulative description into an intermediate processing table.

In view of the example of FIG. 3, the test case 302 may include a several entries in the intermediate processing table. An example entry may include the test case identifier of TC1, the beginning step number of one, the ending step number of two, and the cumulative test description of "Launch Browser and navigate to www.someestore.com Enter username and password and click on login." Another entry may include the case identifier of TC1, the beginning step number of two, the ending step number of four, and the cumulative test description of "Enter username and password and click on login Search for Mobile phones with 3 rear cameras select 2 phones from search results."

A second step is to process the concatenated descriptions so that the system is able to more efficiently compare each concatenated description. Because test step descriptions can be lengthy and include thousands of characters, concatenated descriptions may be even longer. In some instances, concatenated descriptions may be over four thousand characters which may be the upper limit of some databases. In some instances, the concatenated descriptions may be stored in as a large object data type. In this case, the system may not be able to perform the necessary operations for analysis. In order to prevent these limitations from causing difficulty for the system, the system creates a signature for each concatenated description. The signature should be small, such as less than one hundred characters. The signature should be the same for each identical concatenated description. Generating each signature should not be computationally expensive. An example process that satisfies these three requirements is hashing, such as with the SHA256 hashing algorithm.

The hash of each concatenated description may be the same length and may replace the concatenated description in the processing table. Following the example above related to test case 302, an example entry may include the test case identifier of TC1, the beginning step number of one, the ending step number of two, and the cumulative test description of "29b985e80e427d1b8862c8ba3920a49d" which is the hash of "Launch Browser and navigate to www.someestore.com Enter username and password and click on login." Another entry may include the case identifier of TC1, the beginning step number of two, the ending step number of four, and the cumulative test description of "a05a74c03bcf86762525256ac1dc1ffd" which is the hash of "Enter username and password and click on login Search for Mobile phones with 3 rear cameras select 2 phones from search results."

A third step is to identify the test step combinations that appear in more than one test case. In this step, the system compares each test step combination and generates some additional fields. A first field is the module output identifier, which is a unique serial number for each test step combination in each test case. A second field if a module identifier that is unique identifier for each unique test step combination.

In reference to FIG. 3, module 316 may include a module output identifier of 3, a module identifier of 1, a test case identifier of 306, a beginning step identifier of 4, and an ending step identifier of 6. For module 308, the module output identifier may be 1, the module identifier may be 1, the test case identifier may be 302, the beginning step identifier may be 1, and the ending step identifier may be 3. For module 310, the module output identifier may be 4, the module identifier may be 2, the test case identifier may be 302, the beginning step identifier may be 1, and the ending step identifier may be 5.

A fourth step is to identify the modules identifies in the third step that are sub-modules of larger modules. In other words, there may be two test cases that have five consecutive test steps in common. Those two test cases also have four consecutive test steps in common, as well as three test steps, and two test steps.

The system generates an additional field for the modules that are subsets of other modules. The system may reference the module output identifier of the module that the current module is a subset of. For example, module 308 may be a subset of module 310 and module 312. In some instances a subset of a module may be shared in another test case. For example, module 308 is a sub-module of module 310 and module 312. However, module 316 appears in test case 306 without the additional two test steps of module 310 and module 312. In this instance, the steps of module 308 and module 314 should not be removed as unnecessary sub-modules. In some implementations, the system may generate an additional field for each module output identifier that indicates the number of test steps in that module.

A fifth step is to identify the modules that may be similar to other modules. As described above, the system compares modules based on an exact match of a hash of test steps. If the text of two test step concatenations vary by a comma, then the hash will be different, and the system will identify them as different modules. It may be beneficial to identify similar modules and merge them into a single module. To determine whether modules are similar, the system may generate various n-grams of the test step concatenation. For example, the system may generate monograms and bigrams. The system may compare the monograms and bigrams of a module to the other monograms and bigrams of other modules. The system may assign a separate scores to the various n-grams. For example, the system may assign one score to the monograms and a second score to the bigrams. The score may be based on the number of monograms in common between two modules and the number of bigrams in common between two modules. The system may sum these two scores together and divide the sum by the total number of words in the module test step concatenation to generate a similarity score. The system may compare the similarity score to a threshold similarity score to determine whether the two modules are similar. The threshold may be based on the size of the test cases, the number of the test cases, and/or the number of modules identified. If the similarity score satisfies the threshold, then the system may merge the two modules.

A sixth step in the identification of common modules is to prioritize the modules of the test cases based on three factors. The three factors include the probability of a test case to find error based on previous execution results, the number of test steps in the module, and the number of times that the module appears in the test cases. In some instances, the higher the probability, the higher the number of test steps, and the higher the number of times the module appears, the better.

The system may add these three factors as fields to modules. The system may calculate a priority value based on these three factors. For example, the priority value may be a sum of the three values or product of the three values. In some instances, a single module will have different priority values for each of the factors. This may occur because the probably of different test cases to find errors may be different. In this case, the system may average the different priority values or consider the highest priority value.

The system may consider additional parameters to determine the priority of various modules. An additional parameter may be the business criticality of the functionality, which can be identified based on the usage of the functionality in production through log analytics and/or based on the business criticality of the functionality identifies by a business analyst. Another parameter may be the stability of the underlying code that is based on the extend of code churn for each of the software functionality and/or how frequently do test cases associated with the software functionality fail. Another parameter may be the uniqueness of the functionally. A higher functionality can be achieved by automating modules that test unique functionality. Therefore, the system can calculate the functionality uniqueness of each module and prioritize based on the uniqueness. In other words, the modules that have higher uniqueness can be automated first.

The system may perform a seventh step after prioritizing the modules based on the criteria mentioned above. The seventh step may include automating the modules. For automating test cases 302, 304, and 306, the system automates module 308 and 316. Once the system automates this module, the system automates test case 302 by invoking the automated module 308/316 and adding additional code for steps four and five. For test case 304, the system would invoke module 308/314/316 and add the additional code for steps four through ten. For test case 306, the system can write automation code for steps one through three, invoke module 308/314/316, and add code for step seven. In this case, out of the twenty-two steps in test cases 302, 304, and 306, the system only writes code for sixteen of those steps, which is a twenty-two percent reduction in processing requirements.

In some implementations, generating test automation scripts may be perform by several developers. This process may be followed by an automation engineer to generate automation scripts by reading the test case and identifying the intent of the test case, the entities (e.g., people, objects, locations, time components, etc.), the actions performed by the entities, and the expected results. The automation engineer generates the automation script based on these factors.

Figure 4:
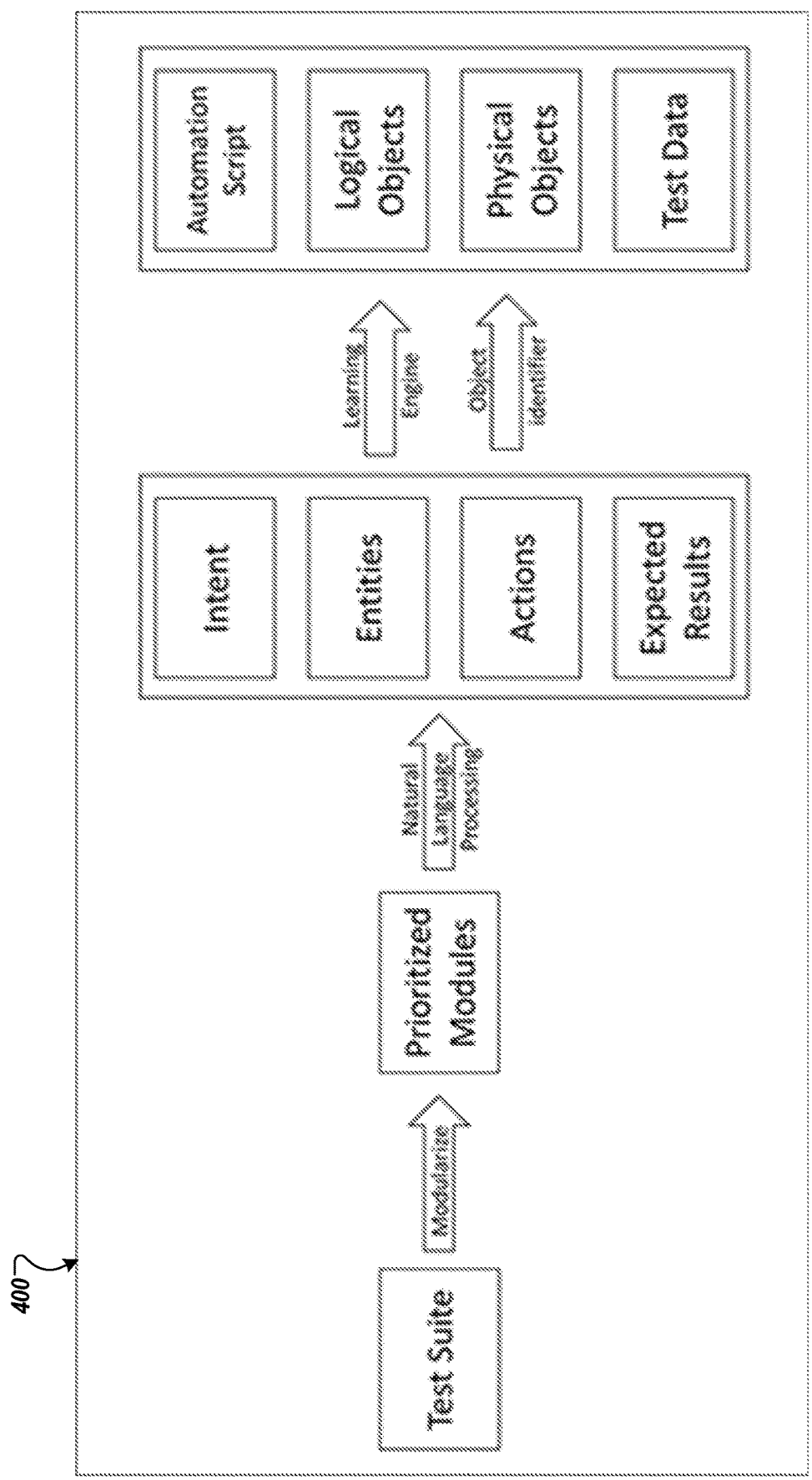
FIG. 4 is a block diagram of a system for automatically generating automation test scripts.

FIG. 4 is a block diagram of a system 400 for automatically generating automation test scripts. The system analyzes the modules identified in the previous steps using natural language processing techniques such as extracting parts of speech. the system extracts and identifies the intent, the entities, the actions, and the expected results.

The information extracted is mapped to existing automation scripts using machine learning algorithms like KNN clustering. Initially, there may be no automation scripts hence, it will be created by an engineer. As the corpus of automation scripts grows, the machine learning algorithms will start identifying the automation scripts that can be reused for a specific module and the modified code will be generated automatically. In addition to the automation script, the machine learning algorithm will also identify the logical objects and test data required for executing the automation scripts. An object recognition tool is used for identifying the physical objects from the software developed by developers.

The system may also maintain the test suites. This may involve adding new test cases, modifying existing test cases, and removing test cases. Once the test cases have been modularized, when a software functionality changes, all or nearly all of the test cases associated with the modified functionality should be modified, all the modules associated with test cases in the above step should be selected, and relevant changes should be made to the impacted modules.

In case a functionality change impacts test cases that refer to a then, a copy of the Module should be created. Test cases not impacted by the functionality change will refer to the original module and test cases impacted by the functionality change will refer to the new module, which was modified by making a copy of the original module.

Figure 5:
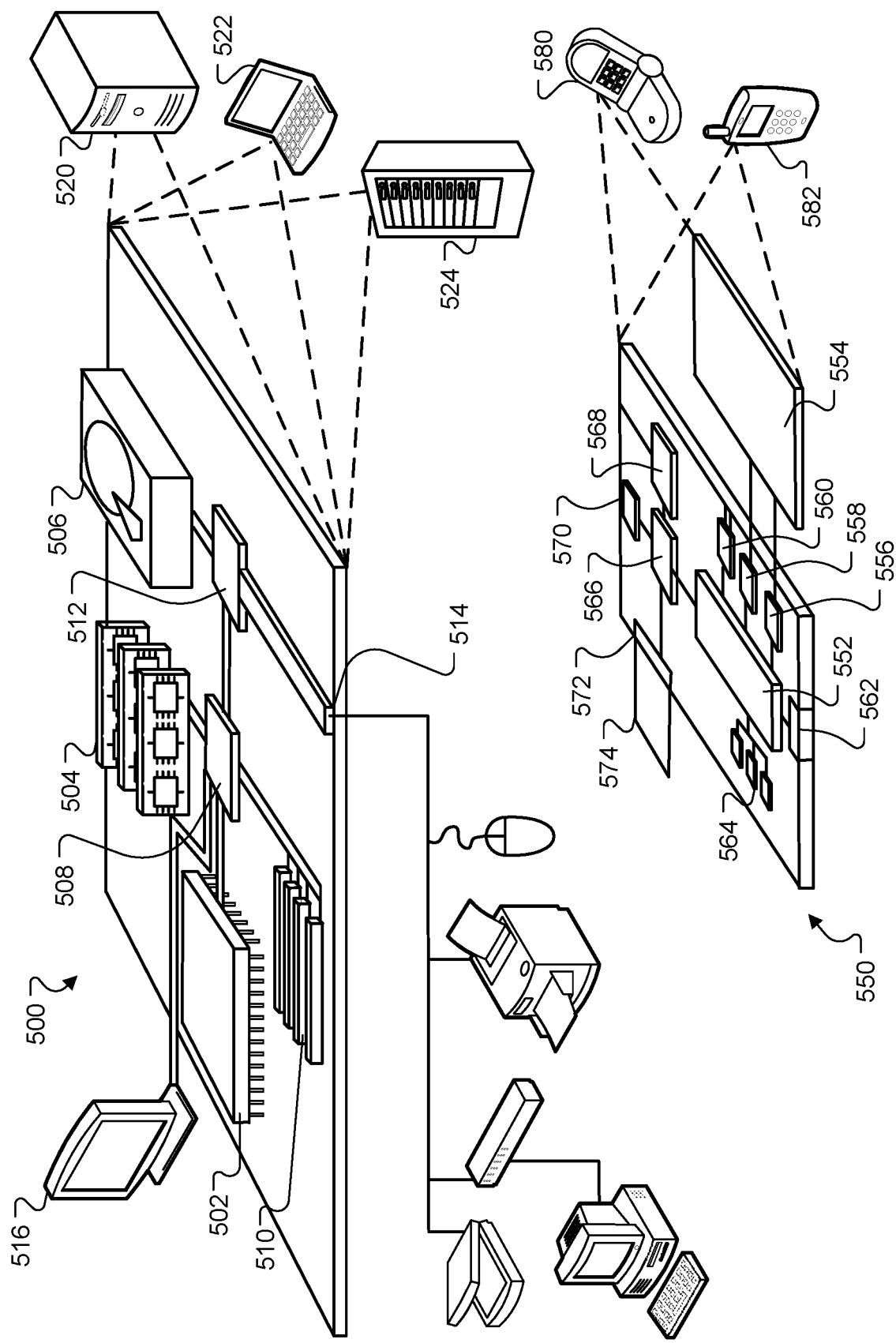
FIG. 5 illustrates an example of a computing device and a mobile computing device.

FIG. 5 shows an example of a computing device 500 and a mobile computing device 550 that can be used to implement the techniques described here. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various buses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards. In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device, such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provided as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver.

In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, the logic flows described in the application do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims. Also, a feature described in one aspect or implementation may be applied in any other aspect or implementation.

What is claimed is:

1. A computer-implemented method comprising:
accessing, by a computing device, plurality of test cases, where each test case of the test cases includes a plurality of test steps;
identifying, by the computing device, a first group of modules, where each module of the first group of modules includes at least two sequential test steps in one or more of the plurality of test cases;
comparing, by the computing device, each module in the first group of the modules to each other module in the first group of the modules;
identifying, by the computing device, a second group of the modules that are included in the first group of the modules, where each module of the second group of modules includes the same first sequential test steps;
determining, by the computing device, (i) each module in a third group of the modules, that are included in the first group of the modules, includes the same first sequential test steps and same second sequential test steps and (ii) the first sequential test steps are not included in another module in the first group of modules without the same second sequential test steps;
based on determining (i) each module in the third group of the modules, that are included in the first group of the modules, includes the same first sequential test steps and the same second sequential test steps and (ii) the first sequential test steps are not included in the another module in the first group of modules without the same second sequential test steps, generating, by the computing device, a fourth group of the modules by removing the second group of modules from the first group of modules;
after generating the fourth group of modules:
determining, for each module in the fourth group of modules, a plurality of n-grams from each test description of the module;
determining a number of n-grams that each pair of modules has in common;
comparing, based on the number of n-grams that each pair of modules has in common, the n-grams of each module in the fourth group of modules to each other;
based on comparing the n-grams, identifying modules that are substantially similar; and
updating the fourth group of modules based on identifying the modules that are substantially similar;
selecting, by the computing device, a subset of the updated fourth group of the modules; and
updating, by the computing device, the plurality of test cases by modularizing the test steps that correspond to the subset of the updated fourth group of the modules.

2. The method of claim 1, comprising:
before identifying the first group of modules:
providing, by the computing device, each test case as an input to a model that determines whether each test step is a significant step;
receiving, by the computing device and from the model, data indicating whether each test step is a significant step; and
removing, by the computing device and from each test case, each test step that is identified as not significant.

3. The method of claim 2, comprising:
receiving, by the computing device, data identifying multiple test steps that are each labeled as either significant or not significant; and
training, by the computing device and using machine learning, the model using the data identifying the multiple test steps that are each labeled as either significant or not significant.

4. The method of claim 1, wherein comparing each module in the first group of modules to each other module in the first group of modules comprises:
concatenating step descriptions of test steps in each module; and
comparing the concatenated step descriptions.

5. The method of claim 4, wherein comparing the concatenated step descriptions comprises:
hashing each concatenated step description; and
comparing the hashed concatenated step descriptions.

6. The method of claim 1, wherein comparing the n-grams of each module in the fourth group of modules to each other comprises:
comparing the number of n-grams that each pair of modules has in common to a threshold.

7. The method of claim 1, wherein selecting a subset of the updated fourth group of the modules comprises:
determining a probability of identifying an failure by each test case for each module in the updated fourth group of modules;
determining a number of test steps in each module in the updated fourth group of modules;
determining an occurrence frequency for each module in the test cases; and
selecting the subset of the updated fourth group of the modules based on the probability, the number of test steps and the occurrence frequency.

8. A system comprising:
one or more computers; and
one or more storage devices storing instructions that are operable, when executed by the one or more computers, to cause the one or more computers to perform operations comprising:
accessing, by a computing device, plurality of test cases, where each test case of the test cases includes a plurality of test steps;
identifying, by the computing device, a first group of modules, where each module of the first group of modules includes at least two sequential test steps in one or more of the plurality of test cases;

comparing, by the computing device, each module in the first group of the modules to each other module in the first group of the modules;

identifying, by the computing device, a second group of the modules that are included in the first group of the modules, where each module of the second group of modules includes the same first sequential test steps;

determining, by the computing device, (i) each module in a third group of the modules, that are included in the first group of the modules, includes the same first sequential test steps and same second sequential test steps and (ii) the first sequential test steps are not included in another module in the first group of modules without the same second sequential test steps;

based on determining (i) each module in the third group of the modules, that are included in the first group of the modules, includes the same first sequential test steps and the same second sequential test steps and (ii) the first sequential test steps are not included in the another module in the first group of modules without the same second sequential test steps, generating, by the computing device, a fourth group of the modules by removing the second group of modules from the first group of modules;

after generating the fourth group of modules:
determining, for each module in the fourth group of modules, a plurality of n-grams from each test description of the module;
determining a number of n-grams that each pair of modules has in common;
comparing, based on the number of n-grams that each pair of modules has in common, the n-grams of each module in the fourth group of modules to each other;
based on comparing the n-grams, identifying modules that are substantially similar; and
updating the fourth group of modules based on identifying the modules that are substantially similar;
selecting, by the computing device, a subset of the updated fourth group of the modules; and
updating, by the computing device, the plurality of test cases by modularizing the test steps that correspond to the subset of the updated fourth group of the modules.

9. The system of claim 8, wherein the operations comprise:
before identifying the first group of modules:
providing, by the computing device, each test case as an input to a model that determines whether each test step is a significant step;
receiving, by the computing device and from the model, data indicating whether each test step is a significant step; and
removing, by the computing device and from each test case, each test step that is identified as not significant.

10. The system of claim 8, wherein the operations comprise:
receiving, by the computing device, data identifying multiple test steps that are each labeled as either significant or not significant; and
training, by the computing device and using machine learning, the model using the data identifying the multiple test steps that are each labeled as either significant or not significant.

11. The system of claim 9, wherein comparing each module in the first group of modules to each other module in the first group of modules comprises:

concatenating step descriptions of test steps in each module; and
comparing the concatenated step descriptions.

12. The system of claim 11, wherein comparing the concatenated step descriptions comprises:
hashing each concatenated step description; and
comparing the hashed concatenated step descriptions.

13. The system of claim 9, wherein comparing the n-grams of each module in the fourth group of modules to each other comprises:
comparing the number of n-grams that each pair of modules has in common to a threshold.

14. The system of claim 9, wherein selecting a subset of the updated fourth group of the modules comprises:
determining a probability of identifying an failure by each test case for each module in the updated fourth group of modules;
determining a number of test steps in each module in the updated fourth group of modules;
determining an occurrence frequency for each module in the test cases; and
selecting the subset of the updated fourth group of the modules based on the probability, the number of test steps and the occurrence frequency.

15. A non-transitory computer-readable medium storing software comprising instructions executable by one or more computers which, upon such execution, cause the one or more computers to perform operations comprising:
accessing, by a computing device, plurality of test cases, where each test case of the test cases includes a plurality of test steps;
identifying, by the computing device, a first group of modules, where each module of the first group of modules includes at least two sequential test steps in one or more of the plurality of test cases;
comparing, by the computing device, each module in the first group of the modules to each other module in the first group of the modules;
identifying, by the computing device, a second group of the modules that are included in the first group of the modules, where each module of the second group of modules includes the same first sequential test steps;
determining, by the computing device, (i) each module in a third group of the modules, that are included in the first group of the modules, includes the same first sequential test steps and same second sequential test steps and (ii) the first sequential test steps are not included in another module in the first group of modules without the same second sequential test steps;
based on determining (i) each module in the third group of the modules, that are included in the first group of the modules, includes the same first sequential test steps and the same second sequential test steps and (ii) the first sequential test steps are not included in the another module in the first group of modules without the same second sequential test steps, generating, by the computing device, a fourth group of the modules by removing the second group of modules from the first group of modules;
after generating the fourth group of modules:
determining, for each module in the fourth group of modules, a plurality of n-grams from each test description of the module;
determining a number of n-grams that each pair of modules has in common;

comparing, based on the number of n-grams that each pair of modules has in common, the n-grams of each module in the fourth group of modules to each other;

based on comparing the n-grams, identifying modules that are substantially similar; and updating the fourth group of modules based on identifying the modules that are substantially similar;

selecting, by the computing device, a subset of the updated fourth group of the modules; and updating, by the computing device, the plurality of test cases by modularizing the test steps that correspond to the subset of the updated fourth group of the modules.

16. The medium of claim 15, wherein the operations comprise:

before identifying the first group of modules:

providing, by the computing device, each test case as an input to a model that determines whether each test step is a significant step;

receiving, by the computing device and from the model, data indicating whether each test step is a significant step; and removing, by the computing device and from each test case, each test step that is identified as not significant.

17. The medium of claim 15, wherein selecting a subset of the updated fourth group of the modules comprises:

determining a probability of identifying an failure by each test case for each module in the updated fourth group of modules;

determining a number of test steps in each module in the updated fourth group of modules;

determining an occurrence frequency for each module in the test cases; and selecting the subset of the updated fourth group of the modules based on the probability, the number of test steps and the occurrence frequency.

\* \* \* \* \*

UNITED STATES PATENT AND TRADEMARK OFFICE
CERTIFICATE OF CORRECTION

PATENT NO. : 11,036,622 B2  
APPLICATION NO. : 16/429328  
DATED : June 15, 2021  
INVENTOR(S) : Sunder Ranganathan Nochilur It is certified that error appears in the above-identified patent and that said Letters Patent is hereby corrected as shown below:

In the Claims

In Claim 10, Column 17, Line 56, delete "claim 8," and insert -- claim 9, --, therefor.

In Claim 11, Column 17, Line 65, delete "claim 9," and insert -- claim 8, --, therefor.

In Claim 13, Column 18, Line 8, delete "claim 9," and insert -- claim 8, --, therefor.

In Claim 14, Column 18, Line 14 (approx.), delete "claim 9," and insert -- claim 8, --, therefor.

Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*